Patented Oct. 13, 1925.

1,557,231

UNITED STATES PATENT OFFICE.

FRANK ALOIS ADAMSKI, OF FREMONT, OHIO, ASSIGNOR TO NATIONAL CARBON COMPANY, INC., A CORPORATION OF NEW YORK.

SEALING COMPOSITION COMPRISING SULPHUR-BONDED FIBROUS MATERIAL.

No Drawing.   Application filed February 24, 1923.   Serial No. 621,091.

*To all whom it may concern:*

Be it known that I, FRANK A. ADAMSKI, a citizen of the United States, residing at Fremont, in the county of Sandusky and State of Ohio, have invented certain new and useful Improvements in Sealing Compositions Comprising Sulphur-Bonded Fibrous Material, of which the following is a specification.

This invention relates to the preparation of sealing compositions comprising sulphur and a fibrous material.

The improved compositions are in general capable of advantageous use wherever a strong, impervious closure is desired. I have discovered, however, that they are particularly adapted for sealing galvanic cells, especially dry cells of the commercial Le Clanché type.

The compositions prepared according to this invention have important advantages over pitch, wax, or similar material as sealing plastics for dry cells. For example, the new sealing compositions have been found to adhere closely and tenaciously both to the carbon electrode and to the zinc can. This is not the case with pitch or the like. Crevices commonly are formed between the pitch and the carbon and zinc, permitting objectionable evaporation of the electrolyte solution, or its exudation when the cell is short-circuited or subjected to heavy current drain.

A further important advantage of the new compositions is their relative strength and freedom from brittleness, as compared with pitch, wax, and the like. Also, the sulphur seal is non-fluent at the highest atmospheric temperatures ordinarily attained, and there is accordingly no danger of its flowing from the cell. The "cold flow" of pitch is an objectionable characteristic.

In the preferred form of the invention, a fibrous mineral is mixed with sulphur in fluid condition. Asbestos, serpentine, fibrous varieties of talc, or the like, in a proper state of subdivision, are suitable. From 2 to 40% of such mineral material may be used, though for most purposes the composition is more readily handled if the percentage of the mineral is considerably less than the upper limit stated. A composition particularly adapted for sealing dry cells comprises about 80 parts by weight of sulphur and 20 parts of talc.

A seal composed of sulphur alone is relatively weak and frangible. The admixture of fibrous mineral material corrects these defects and the resulting seal is durable and effective. Organic fibrous materials may be used with somewhat similar results, but the mineral fibers are preferred.

In some cases non-fibrous materials may be added to the sulphur-fiber composition. For example, various inert granular substances may be used as fillers. I have obtained good results with additions of such materials, especially sand, in amounts of from 10% to 40% of the total weight of the composition. As a specific example, the mixture may comprise about 60 parts of sulphur, 33 parts of sand, and 7 parts of fibrous talc or equivalent mineral material. These proportions may be varied as desired, so long as there is sufficient sulphur to form a satisfactory bond, and enough fibrous material to insure the requisite strength in the final product.

The composition may be prepared most readily by heating the sulphur to 180°–190° C. and stirring in the fibrous material, together with such other substances as are to be added. It is desirable to preheat the materials before mixing them with the sulphur. The resulting product can generally be poured at temperatures of from 125° C. to 170° C. It is usually most satisfactory to apply the sealing composition when at about the latter temperature. No appreciable difficulty is met in keeping the composition homogeneous during the pouring step, as the fibrous material tends to remain in suspension. When granular materials are present rather frequent stirring may be necessary.

I am aware that compositions comprising sulphur and fibrous and granular substances have heretofore been suggested for such purposes as cements, plastics for molding, or the like. The present invention, in distinction from the prior art, is based on the discovery that compositions of this type are especially effective when used as sealing means for galvanic cells, and the invention includes the development of special mixtures suitable for this and other purposes.

Various changes may be made in the herein described specific proportions and procedure within the scope of the invention as defined in the appended claims.

I claim:—

1. A composition for use in sealing and the like, comprising a mixture of a fibrous material and sulphur, the sulphur being in considerable excess of the fibrous material and constituting the major ingredient of the composition.

2. The invention according to claim 1, in which the fibrous material is a finely divided mineral.

3. The invention according to claim 1, in which an inert granular substance is added to the composition.

4. A composition for use in sealing and the like, comprising a mixture of sulphur, fibrous material and an inert granular material, the sulphur being the major constituent and the proportion of fibrous material being not less than about 10% of that of the sulphur.

5. The invention according to claim 4, in which the fibrous material is a finely divided mineral.

6. A composition for use in sealing and the like, comprising a mixture of about 80 parts by weight of sulphur and 20 parts of a fibrous mineral material.

In testimony whereof, I affix my signature.

FRANK ALOIS ADAMSKI.